United States Patent
Jiang et al.

(10) Patent No.: US 11,329,309 B2
(45) Date of Patent: May 10, 2022

(54) WOUND ELECTRODE ASSEMBLY WITH EMPTY FOIL SEGMENT

(71) Applicant: Ningde Amperex Technology Limited, Fujian (CN)

(72) Inventors: Jing Jiang, Fujian (CN); Liangzhen Xiao, Fujian (CN)

(73) Assignee: NINGDE AMPEREX TECHNOLOGY LIMITED, Fujian Province (CN)

( * ) Notice: Subject to any disclaimer, the term of this patent is extended or adjusted under 35 U.S.C. 154(b) by 65 days.

(21) Appl. No.: 17/013,702

(22) Filed: Sep. 7, 2020

(65) Prior Publication Data

US 2020/0403264 A1     Dec. 24, 2020

Related U.S. Application Data

(63) Continuation of application No. 16/432,902, filed on Jun. 5, 2019, now Pat. No. 11,158,879, which is a
(Continued)

(51) Int. Cl.
*H01M 10/04*     (2006.01)
*H01M 10/0587*   (2010.01)

(52) U.S. Cl.
CPC ... *H01M 10/0431* (2013.01); *H01M 10/0587* (2013.01)

(58) Field of Classification Search
CPC ......... H01M 10/0431; H01M 10/0587; H01M 10/125; H01M 10/286; H01M 2004/021; H01M 4/70; H01M 4/02; H01M 4/0404
See application file for complete search history.

(56) References Cited

U.S. PATENT DOCUMENTS

| 6,461,759 B1 | 10/2002 | Miller et al. |
| 2006/0024572 A1 | 2/2006 | Lee |

(Continued)

FOREIGN PATENT DOCUMENTS

| CN | 204905336 U | 12/2015 |
| CN | 205376656 U | 7/2016 |

(Continued)

OTHER PUBLICATIONS

Evaluation Report of Utility Model Patent, CN2017214695823, dated Mar. 25, 2020, 6 pgs.
(Continued)

*Primary Examiner* — Imran Akram
(74) *Attorney, Agent, or Firm* — Morgan, Lewis & Bockius LLP

(57) ABSTRACT

A wound electrode assembly, including a first electrode plate including a first current collector and a second electrode plate including a second current collector, wherein the second electrode plate includes a second empty foil segment, the second empty foil segment surrounds the first electrode plate, the second empty foil segment is configured as a tail segment of the second electrode plate, in the second empty foil segment, a surface of the second current collector opposite to the first electrode plate is coated with active substance, a surface of the second current collector away from the first electrode plate is coated with the active substance. The wound electrode assembly to effectively avoids lithium dendrite while improving the utilization of the battery material and the energy density of the battery, thereby improving the safety performance of the battery.

15 Claims, 5 Drawing Sheets

Related U.S. Application Data continuation of application No. PCT/CN2017/109725, filed on Nov. 7, 2017.

(56) References Cited

U.S. PATENT DOCUMENTS

| | | | |
|---|---|---|---|
| 2009/0297929 | A1 | 12/2009 | Uchida |
| 2010/0285342 | A1 | 11/2010 | Lee et al. |
| 2010/0310924 | A1 | 12/2010 | Kaneda et al. |
| 2011/0027636 | A1* | 2/2011 | Lee .................. H01M 50/46 429/94 |
| 2013/0244071 | A1* | 9/2013 | Lee .................. H01M 10/0525 429/94 |
| 2013/0252053 | A1 | 9/2013 | Woo |
| 2014/0004399 | A1 | 1/2014 | Kim et al. |
| 2014/0178729 | A1 | 6/2014 | Chung et al. |
| 2015/0221919 | A1 | 8/2015 | Ueki et al. |
| 2016/0099445 | A1 | 4/2016 | Park et al. |
| 2016/0126528 | A1 | 5/2016 | Park et al. |
| 2016/0260998 | A1 | 9/2016 | Eo et al. |
| 2017/0179461 | A1 | 6/2017 | Moon et al. |
| 2019/0229362 | A1* | 7/2019 | Yoon .................. H01M 10/0587 |

FOREIGN PATENT DOCUMENTS

| | | |
|---|---|---|
| CN | 205828571 | 12/2016 |
| CN | 205828573 U | 12/2016 |
| CN | 205828579 U | 12/2016 |
| CN | 206040883 U | 3/2017 |
| CN | 107086126 A | 8/2017 |
| CN | 206401456 U | 8/2017 |
| CN | 206401457 U | 8/2017 |
| CN | 107171028 A | 9/2017 |
| CN | 206532840 U | 9/2017 |
| EP | 3196961 A1 | 7/2017 |
| JP | 2013143225 A | 7/2013 |
| JP | 2017143005 A | 8/2017 |
| KR | 20070097152 A | 10/2007 |
| KR | 20170074584 | 6/2017 |

OTHER PUBLICATIONS

Jiang, Notice of Allowance, U.S. Appl. No. 16/432,902, dated Jun. 25, 2021, 10 pgs.

Ningde Amperex Technology Limited, International Search Report and Written Opinion, PCT/CN2017/109725, dated Apr. 3, 2018, 12 pgs.

Ningde Amperex Technology Limited, International Preliminary Report on Patentability, PCT/CN2017/109725, dated May 12, 2020, 4 pgs.

Ningde Amperex Technology Limited, Requisition by the Examiner, CA3,076,957, Jun. 3, 2021, 6 pgs.

Office Action, JP2020517537, dated Apr. 13, 2021, 3 pgs.

Office Action, KR10-20207009247, dated Mar. 29, 2021, 4 pgs.

Ningde Amperex Technology Limited, Office Action, BR112020009056-5, dated Aug. 3, 2021, 4 pgs.

Ningde Amperex Technology Limited, Extended European Search Report, EP17931583.3, dated Oct. 5, 2020, 8 pgs.

* cited by examiner

WOUND ELECTRODE ASSEMBLY WITH EMPTY FOIL SEGMENT

CROSS-REFERENCE TO RELATED APPLICATION

This application is a continuation application of U.S. patent application Ser. No. 16/432,902, filed on Jun. 5, 2019, which is a Continuation Application of PCT application No. PCT/CN2017/109725, filed on Nov. 7, 2017, and the entire contents of which are incorporated herein by reference.

TECHNICAL FIELD

The present application relates to the field of battery, in particular, to a wound electrode assembly.

BACKGROUND

With the development of science and technology, various types of electronic products have emerged in an endless stream. In recent years, the requirements for battery energy density and safety have become higher and higher.

In the prior art, in order to improve efficiency, the electrode plate in the electrode assembly structure often adopts a continuous coating process, which causes waste of surface active substance inside the electrode assembly, and there is a risk of short circuit at a first corner of the inner electrode plate of the electrode assembly due to lithium precipitation, which seriously affects the energy density and safety of the battery.

SUMMARY

In view of the problems existing in the prior art, the purpose of the present application is to provide a wound electrode assembly to effectively avoid lithium dendrite while improving the utilization of the battery material and the energy density of the battery, thereby improving the safety performance of the battery.

According to one aspect of present application, a wound electrode assembly is provided, including a first electrode plate including a first current collector and a second electrode plate including a second current collector, wherein the second electrode plate includes a second empty foil segment, the second empty foil segment surrounds the first electrode plate, the second empty foil segment is configured as a tail segment of the second electrode plate, in the second empty foil segment, a surface of the second current collector opposite to the first electrode plate is coated with active substance, a surface of the second current collector away from the first electrode plate is coated with the active substance.

The beneficial effects of the present application are as follows:

In the wound electrode assembly of the present application, the first electrode plate and the second electrode plate form a plug-in structure at the winding center. Therefore, the active substances on the first head segment and the second head segment are opposite to each other, and no excess active substance is wasted. This winding of the first electrode plate and the second electrode plate improves the utilization of the battery material and the energy density of the battery.

Since the empty foil segment surrounding the second head segment is disposed on the first electrode plate and one side of the empty foil segment facing the second electrode plate is not coated with the active substance, lithium may not precipitated at the starting end of the first electrode plate, lithium dendrite is effectively avoided, and the safety performance of the battery is remarkably improved.

BRIEF DESCRIPTION OF THE DRAWINGS

In order to illustrate the technical schemes in the embodiments of the present disclosure more clearly, the drawings which are required to be used in the description of the embodiments of the present disclosure or the prior art are briefly described below. It is obvious that the drawings described below are only some embodiments of the present disclosure. It is apparent to those of ordinary skill in the art that other drawings may be obtained based on accompanying drawings without inventive effort.

DETAILED DESCRIPTION

The embodiments of the present application will be specifically described below in conjunction with the accompanying drawings. It should be noted that the following embodiments may be combined or partially replaced with each other in any possible manner.

Figure 3:
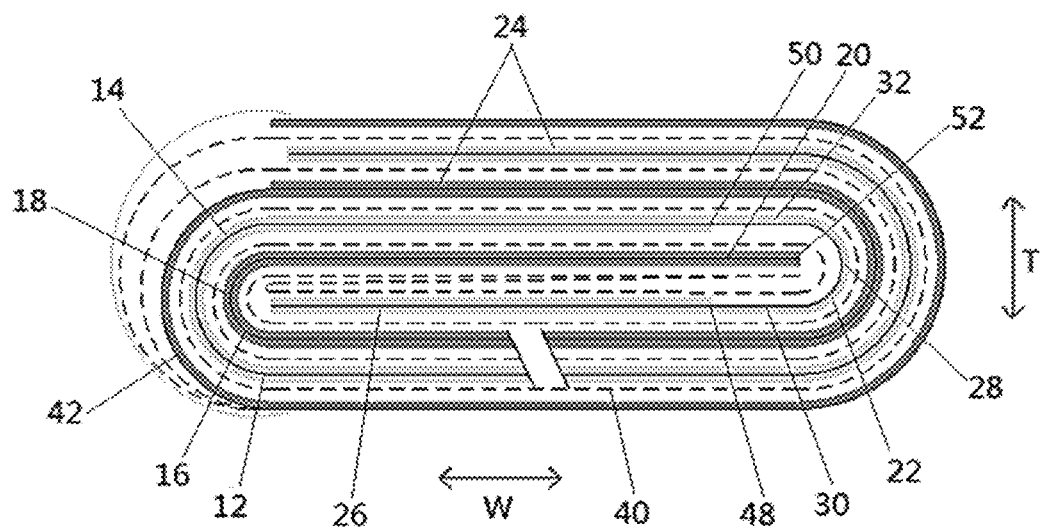
FIG. 3 is a schematic view of a wound electrode assembly according to another embodiment of the present application.

Referring to FIGS. 2-6, the present application provides a wound electrode assembly 10. Specifically, the wound electrode assembly 10 includes a first electrode plate 14 and a second electrode plate 18, and the first electrode plate 14 and the second electrode plate 18 are wound around each other to form the wound electrode assembly 10 shown in FIG. 7. The first electrode plate 14 includes a first current collector 12 and active substances 24 coated on the first current collector 12. Similarly, the second electrode plate 18 includes a second current collector 16 and active substances 24 coated on the second current collector 16. The first electrode plate 14 includes an empty foil segment 22. As shown in FIG. 3, the empty foil segment 22 includes a starting end 220 and an ending end 222, with an area where the first electrode plate 14 is bent for the first time. That is to say, the first bend area of the first electrode plate 14 is part of the empty foil segment 22. The second electrode plate 18 includes a second head segment 20. The second head segment 20 refers to a segment between a starting end of the second electrode plate 18 and a first bend segment of the second electrode plate 18, wherein the second current collector 16 in the second head segment 20 is coated with the active substance 24 on both sides, and projections of the starting end 220 and the ending end 222 of the empty foil segment 22 in a thickness direction T of the wound electrode assembly 10 fall on the second head segment 20. In other words, the empty foil segment 22 includes an opening and the second head segment 20 extends from the opening into an area surrounded by the empty foil segment 22.

In above embodiment, since the empty foil segment 22 surrounding the second head segment 20 of the second electrode plate 18 is disposed on the first electrode plate 14 and one side of the empty foil segment 22 facing the second electrode plate 18 is not coated with the active substance 24, lithium may not precipitated at the starting end of the first electrode plate 14, lithium dendrite is effectively avoided, and the safety performance of the battery is remarkably improved.

Figure 1:
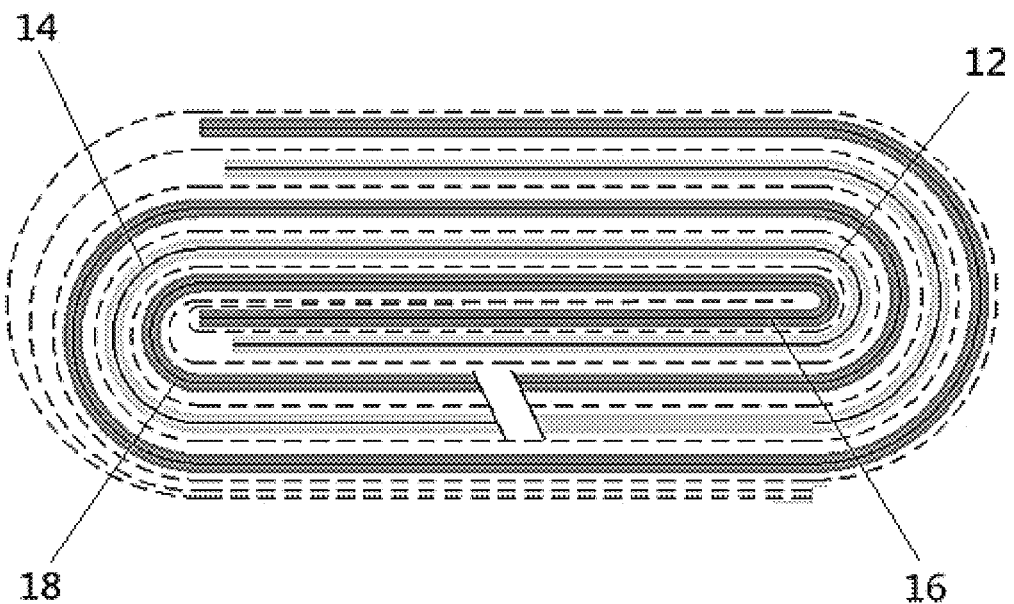
FIG. 1 illustrates a schematic view of a prior art wound electrode assembly.
Figure 2:
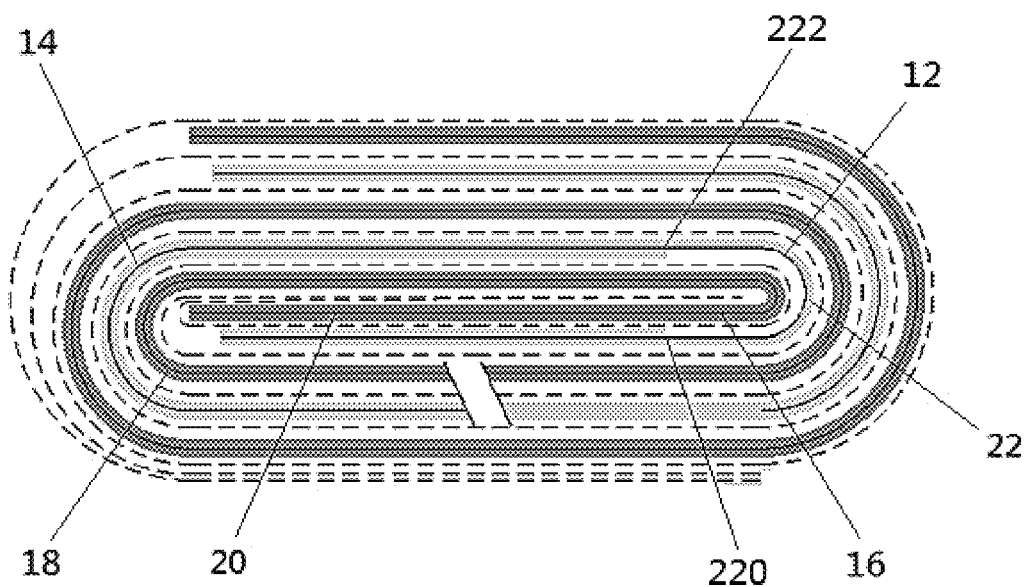
FIG. 2 is a schematic view of a wound electrode assembly according to an embodiment of the present application.

In an embodiment of the present application, as shown in FIG. 3, a winding center of the wound electrode assembly 10 forms a plug-in structure. In this structure, both sides of the second head segment 20 are the first electrode plate 14, so that both sides of the second head segment 20 are directly opposite to the empty foil segment 22 of the first electrode plate 14. Compared with the prior art shown in FIG. 1 and the winding method in which the second head segment is more than one turn of the first head segment in the embodiment of the present application shown in FIG. 2, this plug-in winding center of the wound electrode assembly 10 may significantly save material, improve electrode assembly energy density and improve space utilization.

According to an embodiment of the present application, as shown in FIGS. 2-6, in the empty foil segment 22, one side of the first current collector 12 facing away from the second head segment 20 (i.e., the surface facing outside of the wound electrode assembly 10) is coated with the active substance 24, and one side facing the second head segment 20 (i.e., the surface facing the center of the wound electrode assembly 10) is not coated with the active substance 24.

In addition, in an embodiment of the present application, as shown in FIGS. 3-6, the first electrode plate 14 includes a first head segment 26 that is connected to the empty foil segment 22, wherein the first head segment 26 refers to the segment between the starting end of the first electrode plate 14 and the starting end of the empty foil segment 22, and the first head segment 26 is disposed parallel to and spaced apart from the second head segment 20.

Further, according to an embodiment of the present application, as shown in FIGS. 3-6, the empty foil segment 22 includes a bent segment 28, a first extension segment 30 extending from the starting end of the bend segment 28, and a second extension segment 32 extending from the ending end of the bend segment 28, wherein the first extension segment 30 and the first head segment 26 of the first electrode plate 14 are continuously connected to each other. That is to say, the bend segment 28 of the empty foil segment 22 is a first bend segment of the first electrode plate 14, and the empty foil segment 22 is directly connected to the first head segment 26 without being connected to the first head segment 26 via any additional winding segment of the first electrode plate 14. Moreover, projections of the ending end 48 (the ending end 48 here corresponds to the starting end 220) of the first extension segment 30 and the ending end 50 (the ending end 50 here corresponds to the ending end 222) of the second extension segment 32 on the second head segment 20 are spaced apart from a starting end 52 of the second head segment 20. That is to say, in the thickness direction T of the wound electrode assembly 10, neither the ending end 48 of the first extension segment 30 nor the ending end 50 of the second extension segment 32 are aligned with the starting end 52 of the second head segment 20. In order to achieve that the empty foil segment 22 encloses the second head segment 20, the starting end 52 of the second head segment 20 is closer to the bend segment 28 relative to the ending end 48 of the first extension segment 30 and the ending end 50 of the second extension segment 32, so that the second head segment 20 extends into the empty foil segment 22. Illustratively, in an embodiment of the present application, the ending end 48 of the first extension segment 30 and the ending end 50 of the second extension segment 32 are aligned in the thickness direction T of the wound electrode assembly 10, and are spaced apart from the starting end 52 of the second head segment 20 by a first distance D in a width direction W. For example, the first distance D is 4 mm, in which case the starting end 52 of the second head segment 20 extends to a distance of 4 mm in the empty foil area 22.

In the above embodiments and other possible embodiments of the present application, the first electrode plate 14 is a cathode plate, and the second electrode plate 18 is an anode plate.

Figure 4:
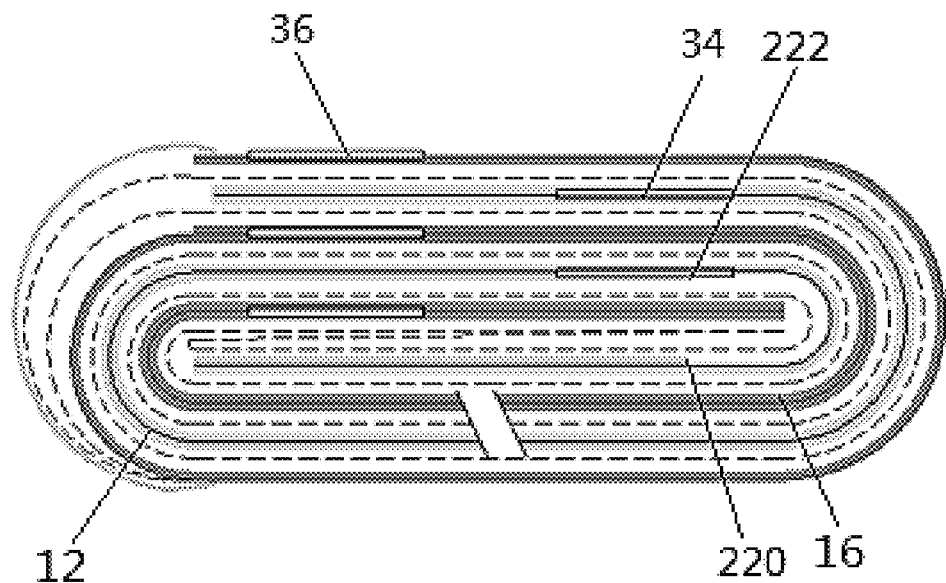
FIG. 4 is a schematic view of a wound electrode assembly according to another embodiment of the present application.
Figure 5:
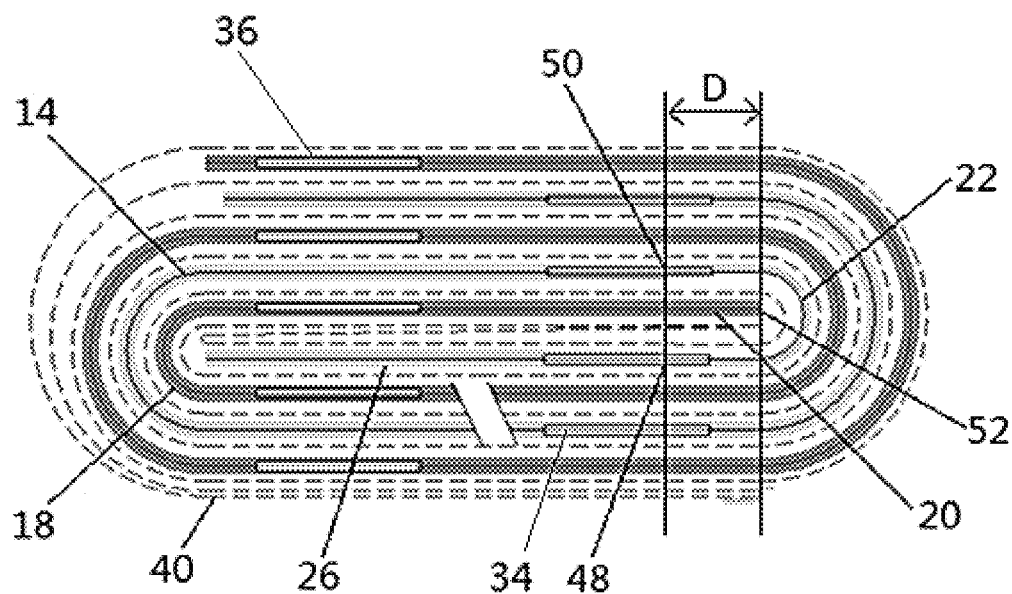
FIG. 5 is a schematic view of a wound electrode assembly according to another embodiment of the present application.

Moreover, as shown in FIGS. 4-9, the wound electrode assembly 10 of the present application may further include a plurality of first electrode tabs 34 electrically connected to the first current collector 12 and a plurality of second electrode tabs 36 electrically connected to the second current collector 16. Among them, in the embodiment of the present application, as shown in FIG. 4, one first electrode tab 34 is disposed on each turn of the first current collector 12, and one second electrode tab 36 is disposed on each turn of the second current collector 16; alternatively, as shown in FIG. 5, one first electrode tab 34 is disposed on each half turn of the first current collector 12, and one second electrode tab 36 is disposed on each half turn of the second current collector 16. It should be noted here that in the wound electrode assembly 10 of the present application, the frequency at which the first electrode tabs 34 and the second electrode tabs 36 are configured may vary depending on the actual application, and the present application is not limited thereto. Furthermore, in the present application, the first electrode tabs 34 and the second electrode tabs 36 are integrally formed with the first current collector 12 and the second current collector 16, respectively, that is, the first electrode tabs 34 and the first current collector 12 are made of the same foil. For example, the first electrode tab 34 may be formed by cutting the first current collector 12 that is not coated with the active substance, and the second electrode tabs 36 and the second current collector 16 may also be made by the same method. Alternatively, in other embodiments, the first electrode tabs 34 and the second electrode tabs 36 may be welded to the first current collector 12 and the second current collector 16, respectively.

Figure 8:
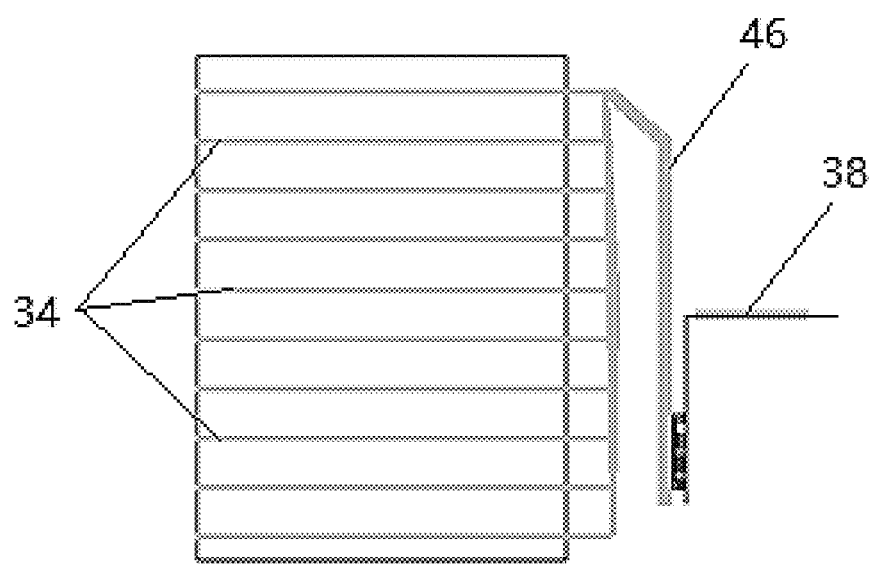
FIG. 8 illustrates a connection manner between a first electrode tab and adapter plates.
Figure 9:
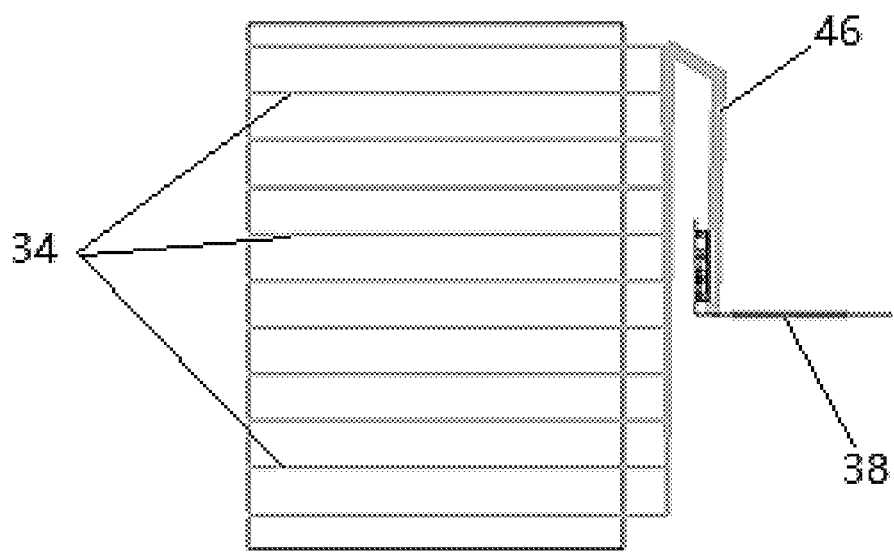
FIG. 9 illustrates another connection manner between a first electrode tab and adapter plates.

In an embodiment of the present application, the first electrode tabs 34 and the second electrode tabs 36 are connected to an external device through adapter plates 38. Specifically, as shown in FIG. 8, a plurality of first electrode plates 34 of the first electrode plate 14 are smoothly stacked together toward the thickness direction T of the wound electrode assembly 10 and extend a segment of connecting segment 46, wherein the adapter plate 38 is welded in the same direction as the connecting segment 46. The so-called welding in the same direction, that is, an extending direction of a welded end of the connecting segment 46 is the same as an extending direction of the welded end of the adapter plate 38. For example, in the embodiment shown in FIG. 8, both extend in a direction that is vertically downward. Unlike the welding method shown in FIG. 8, in the embodiment shown in FIG. 9, the connecting segment 46 is welded in an opposite direction with respect to the adapter plate 38. The so-called welding in an opposite direction means that the extending direction of the welded end of the connecting segment 46 is different from the extending direction of the welded end of the adapter plate 38. For example, in the embodiment shown in FIG. 9, the extending direction of the welded end of the connecting segment 46 is vertically downward, and the extending direction of the welded end of the adapter plate 38 is vertically upward. Since the second electrode tab 36 is connected to the adapter plate 38 in the same manner as the first electrode tab 34, it will not be described in detail herein.

As shown in FIGS. 3-6, in an embodiment of the present application, in the first electrode plate 14, in addition to the empty foil segment 22, both sides of the first current collector 12 are coated with the active substance 24, and the first electrode plate 14 extends no more than the second electrode plate 18, i.e. the first electrode plate 14 is always surrounded by the second electrode plate 18.

As shown in FIG. 5, in an embodiment of the present application, both sides of the entire second current collector 16 of the second electrode plate 18 are coated with the active substance 24, and a tail segment of a separator 40 disposed between the first electrode plate 14 and the second electrode plate 18 surrounds an outer portion of the wound electrode assembly 10. In this embodiment, the second electrode plate 18 may be continuously coated with the active substance 24 in a relatively simple process.

Figure 6:
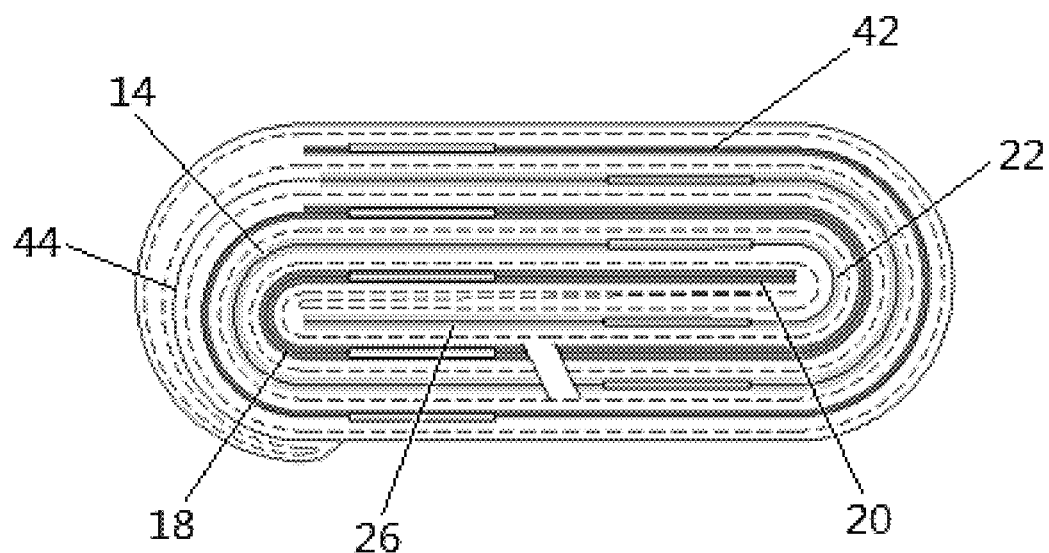
FIG. 6 is a schematic view of a wound electrode assembly according to a still another embodiment of the present application.
Figure 7:
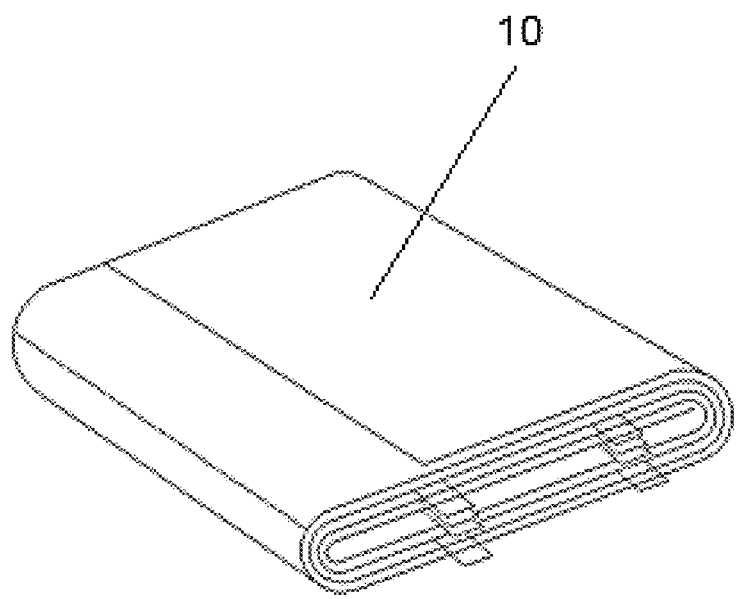
FIG. 7 is a perspective view of a wound electrode assembly according to an embodiment of the present application.

In addition, as shown in FIG. 6, in an embodiment of the present application, the second electrode plate 18 includes a second empty foil segment 42, wherein the second empty foil segment 42 surrounds an outer side of the first electrode plate 14, and in the second empty foil segment 42, one side of the second current collector 16 facing the first electrode plate 14 is coated with the active substance 24, and one side facing away from the first electrode plate 14 is not coated with the active substance 24. In this embodiment, by providing the second empty foil segment 42, the number of outer separator and the active substance of the ineffective first electrode plate may be saved, and the energy density of the battery may be improved while saving costs.

Further, referring to FIG. 6, in an embodiment of the present application, the first current collector 12 further includes an extended current collector segment 44 extending from a ending end of the first electrode plate 14, wherein both sides of the extended current collector segment 44 are not coated with the active substance 24 and surrounded an outer side of the second empty foil segment 42.

In the above embodiment, when the second electrode plate 18 leaves the second empty foil segment 42, the empty foil segment 42 may be at least one turn, and the empty foil segment 42 encloses the first electrode plate 14 to prevent the empty copper foil from directly contacting the aluminum plastic film to form electrical corrosion, which causes safety problems. At the same time, the formation of a vest area may improve the heat dissipation speed, and effectively preventing the problem of fire and explosion of the electrode assembly due to abuse such as nailing.

The foregoing is merely illustrative of the preferred embodiments of the present application and is not intended to be limiting of the present application, and various changes and modifications may be made by those skilled in the art. Any modifications, equivalent substitutions, improvements, and the like within the spirit and principles of the application are intended to be included within the scope of the present application.

What is claimed is:

1. A wound electrode assembly, comprising:
   a first electrode plate comprising a first current collector;
   a second electrode plate comprising a second current collector; and
   a separator disposed between the first electrode plate and the second electrode plate,
   wherein the second electrode plate comprises a second empty foil segment, the second empty foil segment surrounds the first electrode plate, the second empty foil segment is configured as a tail segment of the second electrode plate,
   wherein in the second empty foil segment, a surface of the second current collector opposite to the first electrode plate is coated with an active substance and a surface of the second current collector away from the first electrode plate is not coated with the active substance,
   wherein along an extension direction of an ending end of the second empty foil segment of the second electrode plate, the ending end of the second empty foil segment of the second electrode plate extends beyond an ending end of the first electrode plate,
   wherein the ending end of the second empty foil segment is located at the outermost turn of a structure formed by wounding the first electrode plate and the second electrode plate, and
   wherein the separator extends beyond the ending end of the first electrode plate such that it surrounds an outer portion of the wound electrode assembly.

2. The wound electrode assembly according to claim 1, wherein the second electrode plate further comprises a first coated segment connected to the second empty foil segment, the first coated segment extending from the second empty foil segment to a head segment of the second electrode plate, both sides of the second current collector of the first coated segment are coated with the active substance.

3. The wound electrode assembly according to claim 1, wherein both sides of the first current collector of the first electrode plate opposite to the first empty foil segment are coated with the active substance.

4. The wound electrode assembly according to claim 1, wherein the second current collector of the second electrode plate opposite to the first electrode plate ending end is coated with the active substance.

5. The wound electrode assembly according to claim 1, wherein the first electrode plate is a cathode plate, and the second electrode plate is an anode plate.

6. The wound electrode assembly according to claim 1, further comprising: a plurality of first electrode tabs electrically connected to the first current collector; and a plurality of second electrode tabs electrically connected to the second current collector.

7. The wound electrode assembly according to claim 6, wherein one of the first electrode tabs is disposed on each turn of the first current collector, and one of the second electrode tabs is disposed on each turn of the second current collector.

8. The wound electrode assembly according to claim 6, wherein the first electrode tabs and the second electrode tabs are integrally formed with the first current collector and the second current collector, respectively, or the first electrode tabs and the second electrode tabs are welded to the first current collector and the second current collector, respectively.

9. The wound electrode assembly according to claim 1, wherein the first electrode plate comprises a first empty foil segment, and the first empty foil segment comprises an area where the first electrode plate is bent for the first time, and the second electrode plate comprises a second electrode plate head segment; the second current collector in the second electrode plate head segment is coated with active substance on both sides, one side of the first empty foil segment facing the second electrode plate head segment is not coated with the active substance, and projections of a starting end and an ending end of the first empty foil segment in a thickness direction fall on the second electrode plate head segment.

10. The wound electrode assembly according to claim 9, wherein both sides of the second electrode plate head segment are provided with the first electrode plate in the thickness direction.

11. The wound electrode assembly according to claim 9, wherein in the first empty foil segment, one side of the first current collector away from the second electrode plate head segment is coated with the active substance.

12. The wound electrode assembly according to claim 9, wherein the first electrode plate comprises a first electrode plate head segment disposed parallel to and spaced apart from the second electrode plate head segment, and the first empty foil segment is connected to the first electrode plate head segment.

13. The wound electrode assembly according to claim 9, wherein the first empty foil segment comprises a bent segment, a first extension segment, and a second extension segment, and the first extension segment and the second extension segment extend from two opposite ends of the bend segment, respectively; wherein projections of a distal end of the first extension segment and a distal end of the second extension segment on the second electrode plate head segment are spaced apart from a starting end of the second electrode plate head segment.

14. The wound electrode assembly according to claim 13, wherein the projection of a distal end of the first extension segment and a distal end of the second extension segment on the second head segment are spaced apart from a starting end of the second head segment by a first distance, the first distance is not less than 4 mm.

15. The wound electrode assembly according to claim 12, the first electrode plate comprising a second coated segment and a third coated segment connected to the second empty foil segment, and the second coated segment extending from the second empty foil segment to a starting end of the first electrode plate head segment, the third coated segment extending from the second empty foil segment to an ending end of the first electrode plate tail segment, the second coated segment and the third coated segment are coated with active material on both sides of the first current collector.

* * * * *